United States Patent [19]

Hilbig et al.

[11] Patent Number: 4,985,152

[45] Date of Patent: Jan. 15, 1991

[54] PROCESS FOR SEPARATING SOLVENTS USED IN THE PURIFICATION OF PRODUCTS

[75] Inventors: Josef Hilbig, Taunusstein; Guenther Welt, Frankfurt am Main; Manfred Ziegelmayer, Bischofsheim, all of Fed. Rep. of Germany

[73] Assignee: Hoechst Aktiengesellschaft, Frankfurt am Main, Fed. Rep. of Germany

[21] Appl. No.: 380,086

[22] Filed: Jul. 14, 1989

[30] Foreign Application Priority Data

Jul. 16, 1988 [DE] Fed. Rep. of Germany ....... 3824147

[51] Int. Cl.$^5$ .............................................. B01D 11/02
[52] U.S. Cl. .................................... 210/771; 210/770; 210/772; 210/783; 210/806; 536/85; 536/111
[58] Field of Search .............. 210/766, 767, 770, 771, 210/772, 780, 783, 806, 359, 400, 416.1; 34/16, 17, 60; 536/84, 85, 87, 88, 98, 99, 111, 124

[56] References Cited

U.S. PATENT DOCUMENTS

| | | | |
|---|---|---|---|
| 4,250,306 | 2/1981 | Lask et al. | 536/85 |
| 4,398,024 | 8/1983 | Bernert et al. | 536/85 |
| 4,404,370 | 9/1983 | Bernert et al. | 536/85 |

FOREIGN PATENT DOCUMENTS 2038310 2/1974 Fed. Rep. of Germany .

OTHER PUBLICATIONS

A. A. J. A. Prinssen, "Vacuum Belt Filters", Filtration and Separation, Mar./Apr. 1979, pp. 176–180.

*Primary Examiner*—W. Gary Jones
*Assistant Examiner*—D. Reifsnyder
*Attorney, Agent, or Firm*—Foley & Lardner

[57] ABSTRACT

The present invention relates to a process and a device for selectively separating the solvents employed in the preparation and purification of products. In this connection the different solvents are removed from the product to be treated by means of mechanical separation and subsequent admission of steam, and are collected separately. As a result of this, mixing of solvents from the preparation and from the purification is avoided, so that the working up of a solvent mixture is superfluous. The proces and the device are preferably used in the process for producing starch ethers and cellulose ethers.

6 Claims, 1 Drawing Sheet

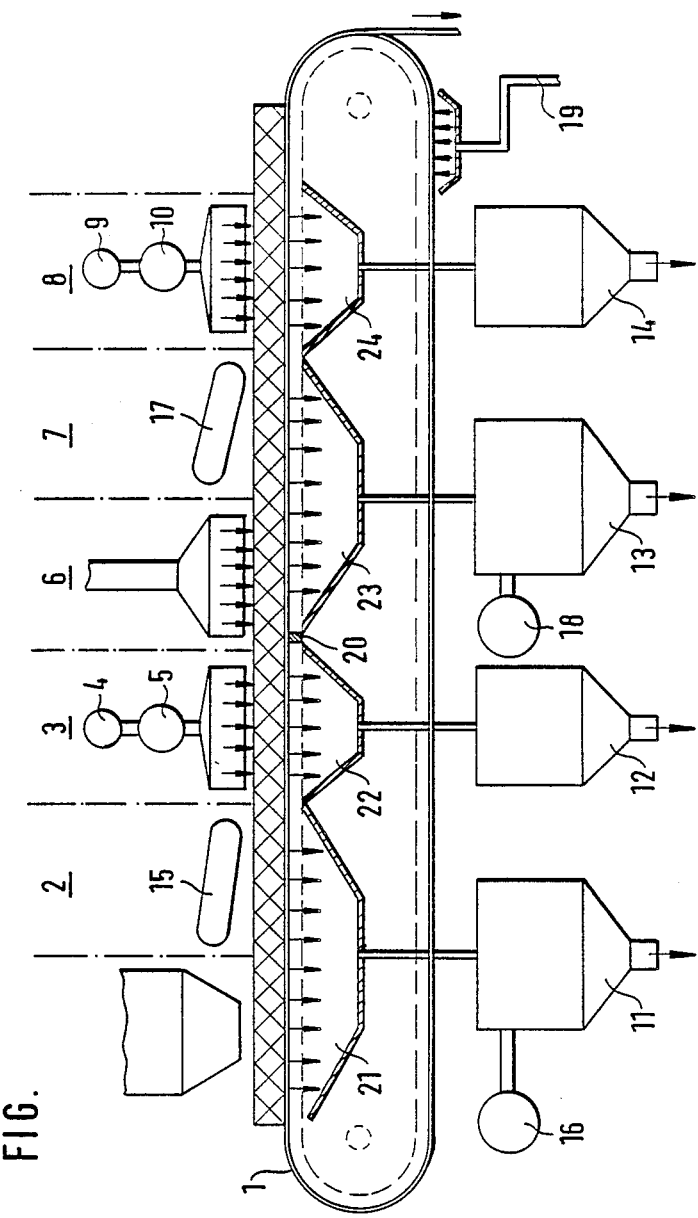

PROCESS FOR SEPARATING SOLVENTS USED IN THE PURIFICATION OF PRODUCTS

BACKGROUND OF THE INVENTION

The present invention relates to a process, preferably operated continuously, and a device for working up different solvents such as are used for result in the preparation and extraction of a very wide variety of products, such as, for example, cellulose ethers. In the following text, "working up" is to be understood as meaning the treatment of materials in which different solvents are used or employed. In the process and the device according to the invention, the various solvents used are separated from one another and are kept separate. In the following text the process and the device are described primarily with reference to the particularly preferred application to cellulose ethers. It is to be understood, however, that the invention has broader application.

The preparation of cellulose ethers is known, such as, for example, carboxymethylcellulose (CMC), hydroxyethylcellulose (HEC), hydroxypropylcellulose (HPC) or methylcellulose (MC) and mixed ethers thereof, in the presence of a moistening or suspending agent during the etherification reaction. Aqueous, aqeuous-organic or mixed organic moistening or suspending agents whose properties are particularly advantageous for the etherification reaction are employed in this process. It is also possible to use etherifying agents themselves, in excess, as a moistening or suspending agent.

The byproducts of the reaction (for example, salts) formed in the course of the etherification must subsequently be removed from the reaction product in order to prepare purified products. It is known in this connection that the moistening or suspending agent used in the reaction as a rule has only a small capacity for dissolving salts and does not contribute substantially to purifying the cellulose ether. The extraction of the impurities from the reaction product is therefore carried out by means of an extracting agent which is better suited to this purpose.

After the reaction, the moistening or suspending agent must be removed from the cellulose ether. Various separation processes, operating continuously or discontinuously, are employed for this removal. Typical for this use are mechanical separation equipment (for example, decanters, filters or centrifuges) or dryers (for example, rotary vacuum dryers or pneumatic dryers which have been rendered inert). In the case of cellulose ethers which are insoluble in hot water, the moistening or suspending agent can be expelled in hot water.

In the case of the mechanical separation processes the moist, crude cellulose ether still contains a certain content of the moistening or suspending agent. This content becomes mixed with the second solvent or solvent mixture which has been specially selected for the extraction. Thus, subsequent to the extraction, an involved separation by distillation of the solvents becomes necessary to enable them to be recycled to the etherification reaction or extraction.

In the course of the removal of the moistening or suspending agent from the crude reaction product by drying, the particles of cellulose ether become horny as a result of the heat treatment. The hornification closes the surface of the particles, so that penetration by the extraction agent in the course of the subsequent extraction with the solvent particularly selected for this purpose is impaired. This causes a prolonged extraction time or a greater usage of solvent. A further disadvantage of intermediate drying of the crude cellulose ether lies in the fact that the dissolving quality of the purified cellulose ether is impaired as a result of the hornification.

In the case of cellulose ethers which are soluble in hot water, when the reaction medium is expelled by means of hot water, the content of reaction medium which has entered the water must subsequently be removed by expensive methods.

A process and a device of the type described above are known, for example, from the literature reference "Proceedings of the Filtration Society, Filtration and Separation", 1979, pages 176–180 and from DE-B 2,038,310, EP-A 0,052,337 (=U.S. Pat. No. 4,398,024) and EP-A 0,053,741 (=U.S. Pat. 4,404,370). When using the processes and devices of the state of the art, however, the different solvents are obtained in the course of the separation as a common mixture of solvents which is only separated at the end of the process.

SUMMARY OF THE INVENTION

One object of the present invention is, therefore, to provide a process for the separation of different solvents used in a process.

Another object of the invention is to provide an apparatus for separating the different solvents employed in a process.

A specific object of the invention resides in the provision of a process and apparatus that render the expensive subsequent working up of a mixture of solvents superfluous.

In accomplishing the foregoing objects, there has been provided in accordance with one aspect of the invention a process for selectively separating solvents differing chemically or in physical composition, obtained in the preparation and purification of products, comprising the steps of: mechanically filtering a major portion of a moistening or suspending agent from a solvent-moist reaction mass on a filter; applying on the same filter an amount of steam sufficient to remove the moistening or suspending agent substantially quantitatively from the reaction mass, and separately collecting the moistening or suspending agent; extracting byproducts of the reaction or impurities on the same filter with a suitable solvent or solvent mixture, in at least one stage, to produce an extract, and separately collecting the extract; mechanically separating a major portion of the extraction agent; applying an amount of steam sufficient to remove the extraction agent substantially quantitatively from the product, and separately collecting the extraction agent; removing purified product from the filter. Optionally, the process further comprises the step of drying the product removed from the filter.

In accordance with another aspect of the invention, there has been provided a device for carrying out the foregoing process comprising: a filter base; and, arranged successively with respect to the filter base a first appliance for mechanically removing by filtration the moistening or suspending agent; an adjacent appliance for applying steam, having associated therewith a control device for metering the steam; an adjacent appliance for applying the extraction agent; an adjacent appliance for mechanically removing the extraction agent by filtration; an adjacent appliance for applying steam, having associated a control device for metering the steam; and separate collecting troughs and vessels for collecting the solvents from the appliances.

Further objects, features and advantages of the invention will become apparent from the detailed description of preferred embodiments that follows, when considered together with the attached figure of drawing.

DETAILED DESCRIPTION OF THE PREFERRED EMBODIMENTS

According to the invention, a process is provided, preferably a continuous process, for selectively separating solvents differing chemically or in physical composition, obtained in the preparation and purification, wherein (a) the bulk of the moistening or suspending agent is separated off mechanically from the solvent-moist reaction mass on a filter, preferably a circulating filter;

(b) an amount of steam sufficient to remove the moistening or suspending agent substantially quantitatively from the reaction mass is then applied on the same filter to the reaction mass, which still contains moistening or suspending agent, the moistening or suspending agent being collected separately;

(c) the byproducts of the reaction or impurities are then extracted on the same filter with a suitable solvent or solvent mixture, if appropriate in several stages, the extract being collected separately;

(d) the bulk of the extraction agent is then separated off mechanically;

(e) an amount of steam sufficient to remove the extraction agent substantially quantitatively from the product is then applied to the product, which still contains extraction agent, the extraction agent being collected separately; and (f) the purified product is removed from the filter and, if desired, dried.

The process thus makes it possible to collect separately the moistening or suspending agent and also extraction agents obtained in the individual stages, as a result of which the time-intensive and cost-intensive working up of the resulting mixture of moistening agent/suspending agent/extraction agent required by the processes and devices of the state of the art is superfluous.

The process is preferably operated continuously, but it can also be operated in a fixed manner or in cycles. It is preferable to employ a continuously circulating belt filter in the process.

In general the process can be used in the treatment and purification of any products, in the preparation and extraction purification of which different solvents are used. In certain cases, however, it can also be advantageous if the solvents used for the suspension and the extraction are identical, but their content of other constituents, such as, for example, water, is different. Here too it is possible to separate the solvents that differ, for example, in water content and to return them separately to a, possibly different, use. In principle, the process can be used for working up any products in which there are differences, preferably of percentage composition, in moistening or suspending agent and extraction agent. The process is, however, preferably employed in the working up and purification of starch ethers and, very particularly preferably, of cellulose ethers.

Examples of moistening or suspending agents customarily used in the preparation of cellulose ethers are shown in the following table:

| Ether | Moistening/ suspending agent | Extraction agent |
|---|---|---|
| carboxymethyl-cellulose (CMC) and mixed ethers, for example CMHEC | isopropanol dimethylglycol (1,2-dimethoxy-ethane) | methanol ethanol ethanol |
| hydroxyethylcellulose (HEC) | tert.-butanol isopropanol dimethylglycol | acetone methanol |
| methylcellulose (MC) methylhydroxyethyl-cellulose (MHEC) methylhydroxypropyl-cellulose (MHPC) and similar mixed ethers | tert.-butanol dimethylglycol dimethyl ether | hot water |
| hydroxypropyl-cellulose (HPC) | tert.-butanol hexane toluene mixed hydrocarbons | hot water |

In the case of the particularly preferred working up of cellulose ethers, the process is especially used in the case of CMC in the system using isopropanol (moistening or suspending agent) and methanol (extraction agent), in the case of HEC in the system using tert.-butanol/acetone or isopropanol/methanol, in the case of MC in the system using dimethylglycol/hot water, and in the case of HPC in the system using dimethylglycol/hot water.

The invention also relates to a device for carrying out the process. The device is composed of the following parts:

(a) a filter base, and, arranged successively, (b) at least one first appliance for mechanically removing the moistening or suspending agent, (c) at least one adjacent appliance for the application of steam, (d) a control appliance for metering the steam, (e) at least one adjacent appliance for applying the extraction agent, (f) at least one adjacent appliance for mechanically removing the extraction agent, (g) at least one adjacent appliance for applying steam, (h) a control appliance for metering the steam, and (i) separate collecting troughs and vessels for collecting the solvents from the appliances.

The filter base preferably comprises a belt filter or disk filter. Continuously circulating band filters or rotary filters have proved particularly successful.

In order to accelerate the mechanical separation of the moistening or suspending agent or of the extraction agent, at least one device is arranged with respect to the appliances (b) and/or (f) to produce an excess or reduced pressure. The excess pressure can be produced, for example, by applying a gas pressure or, in a simple manner by so-called squeezing belts. The reduced pressure is produced by the application of a vacuum. It is preferable to use an excess pressure and a reduced pressure at the same time, both in appliance (b) and in appliance (f). If required, a plurality of appliances can be arranged in succession, particularly those for steaming and/or for the application of the extraction agent. In a particularly suitable embodiment appliances (c) and (e) are separated from one another by a partition, in order to prevent the extraction agent from being sucked into this zone when a reduced pressure is applied in the mechanical separation, which would result in an undesirable mixing of the solvents.

The moistening/suspending or extraction agents are collected in troughs located in the respective zones below the filter appliance, and are drawn off into corresponding receivers. If desired, the filtrates from the mechanical separation and the steaming, or from the extraction and the steaming, can also be combined and then jointly worked up or used further.

The process and the corresponding device are also suitable for directly recycling the corresponding solvents, without previous working up, into new reaction batches or to purification.

The process according to the invention and a special device are described below in relation to the treatment of cellulose ethers, in which regard, however, no limitation to cellulose ethers is intended, since - as already stated - the process and the device can be used in a wide variety of other processes.

After the preparation of the ether, the whole reaction mass is metered continuously onto a circulating filter, and the bulk of the moistening or suspending agent is separated off mechanically. Immediately subsequent to this a controlled amount of steam is sprayed, on the same filter, onto the product, which is still moist with solvent. The condensed steam is adsorbed by the filter cake and it expels the remainder of the moistening or suspending agent from the latter in a substantially quantitative manner.

The filter cake, which travels further in a continuous manner on the filter, is treated in an immediately adjoining section with the second solvent particularly suitable for the extraction, or with hot water, and is thus freed from the reaction byproducts (for example salts) adhering to it.

Immediately after the purification zone, the second solvent—unless hot water has been used—is also removed substantially quantitatively from the purified cellulose ether by renewed steam treatment. The cellulose ether, which is now only moist with water, is removed from the filter and can be finished by known processes (water-drying, grinding or screening).

The moistening or suspending agent which has been separated off mechanically and by the adsorbed steam in the first filter section, as a rule contains little salt and water. As a result of the process according to the invention, it is not mixed with the second solvent used for the extraction or with hot water and can thereby be re-employed in the reaction without further treatment.

The solvent or hot water used for the extraction is, for its part, not contaminated with the moistening or suspending agent used for the reaction and can thus be conveyed to a simple working up operation.

As a result of the continuous process according to the invention it is possible for the first time to separate substantially quantitatively the most advantageous solvents/solvent mixtures for the reaction and extraction on one piece of equipment, so that the involved working up of these solvents/solvent mixtures for re-use is avoided without the need to accept damage to the product as a result of intermediate drying.

Suitable continuous filters are preferably belt filters, but also rotary filters, drum filters and the like—including those in a pressure-resistant modification.

A device in the simplest modification is shown diagrammatically in the attached figure, solely for purposes of illustration.

The figure shows a circulating band filter 1, at the start of which the product containing moistening or suspending agent (represented by crosses) is fed in. The moistening or suspending agent is removed mechanically by the appliance 2, use being made of a squeezing-out belt 15 and, via the receiver 11, of the vacuum appliance 16. The moistening or suspending agent is collected in the collecting trough 21 and is drawn off into the receiver 11. Arranged adjacent to this is an appliance 3, consisting of a hood which is connected to a steam generator 5 and a control appliance 4 for controlling the admission of steam. The moistening agent/suspending agent/water mixture obtained is collected in the trough 22 and drawn off into the receiver 12. A vacuum appliance can, of course, also be connected to this appliance, but is not suitable here. In the appliance 6 the extraction agent is fed in, and in the appliance 7 the material is squeezed out mechanically by means of the squeezing-out belt 17, while a vacuum produced by 18 is applied. The extraction agent is collected in the trough 23 and is drawn off into the receiver 13. A partition 20 is fitted between appliances 3 and 6 and this prevents the mixture obtained in 3 from being sucked into the extraction section. Steam is then again fed in the appliance 8. The steam generated by the appliance 10 is controlled via the control appliance 9 and applied to the material via a hood. The extraction agent/water mixture is collected in the trough 24 and is drawn off into the receiver 14. A vacuum appliance (not shown here) can, of course, be connected to this appliance also. After the purified product has been discharged, drying and granulating appliances can be attached, but it is also possible, for example, for the drying operation to be connected immediately downstream of the appliance 8, before the product is discharged.

It is appropriate to clean the circulating belt filter by means of the purification equipment 19 before it is charged with new material. This cleaning is carried out, for example, by feeding in water or solvent under pressure.

A particularly preferred working up of carboxymethyl-cellulose is described in the following specific example, with reference to the abovedescribed illustrated apparatus.

A reaction mash containing, in addition to CMC, about 5% by weight of NaCl, about 0.5% by weight of Na glycolate, about 13.2% by weight of water and about 64.4% by weight of isopropanol was obtained in the preparation of a highly etherified and highly viscous CMC (DS =0.9; viscosity of 2% strength solution 30,000 mPas).

35.7 kg/hour of this reaction mass were metered onto a circulating filter belt. After squeezing out in 2, the first steam treatment was carried out in 3. The amount of steam applied to the filter cake was 6 kg/hour.

The suspending agent, which issued from the reaction mass at a rate of 28.55 kg/hour, had the following composition:

80.5% by weight of isopropanol,
0.2% by weight of NaCl and
19.3% by weight of water.

Sodium glycolate could not be detected by analysis. The isopropanol content in the filter cake after this first steam treatment was found by analysis to be less than 0.1% by weight.

After being freed from the solvent, the filter cake containing salt passed continuously into the extraction zone 6 and was there extracted with 70% kg/hour. After the extraction, the filter cake containing methanol was freed from methanol by suction, squeezing out and application of 6 kg/hour of steam, and was released from the band. The solvent issuing from the extraction and steaming zone was collected at a rate of 42.16 kg/hour and was composed of 59.7% by weight of methanol, 4.1% by weight of NaCl, 0.4% by weight of sodium glycolate and 35.7% by weight of water. The content of isopropanol detectable by analysis in the methanolic filtrate was less than 0.1% by weight.

What is claimed is:

1. A process for selectively separating solvents differing chemically or in physical composition, obtained in the preparation and purification of products, comprising the steps of:
   (a) mechanically filtering a major portion of a moistening or suspending agent from a solventmoist reaction mass on a filter;
   (b) applying on the same filter an amount of steam sufficient to remove the moistening or suspending agent substantially quantitatively from the reaction mass, and separately collecting the moistening or suspending agent;
   (c) extracting byproducts of the reaction or impurities on the same filter with a suitable solvent or solvent mixture, in at least one stage, to produce an extract, and separately collecting the extract;
   (d) mechanically separating a major portion of the extraction agent;
   (e) applying an amount of steam sufficient to remove the extraction agent substantially quantitatively from the product, and separately collecting the extraction agent; and
   (f) removing purified product from the filter.

2. A process as claimed in claim 1, further comprising the step of drying the product removed from the filter.

3. A process as claimed in claim 1, wherein the process is carried out continuously on a circulating belt filter or rotary filter.

4. A process as claimed in claim 1, wherein the reaction mass comprises a reaction product produced from working up starch ether of cellulose ether.

5. A process as claimed in claim 4, wherein the cellulose ether comprises CMC, HEC, HPC, MC, MHEC or mixed ethers.

6. A process as claimed in claim 5, wherein the ether comprises CMC and the moistening or suspending agent/extraction agent system comprises isopropanol/methanol, or HEC in a system comprising tert.-butanol/acetone or isopropanol/methanol, or MC in a system comprising dimethylglycol/hot water, or HPC in a system comprising dimethylglycol/hot water.

* * * * *